July 11, 1939.  R. J. PRICE  2,165,941
ICE CREAM DIPPER
Filed May 11, 1938  2 Sheets-Sheet 2
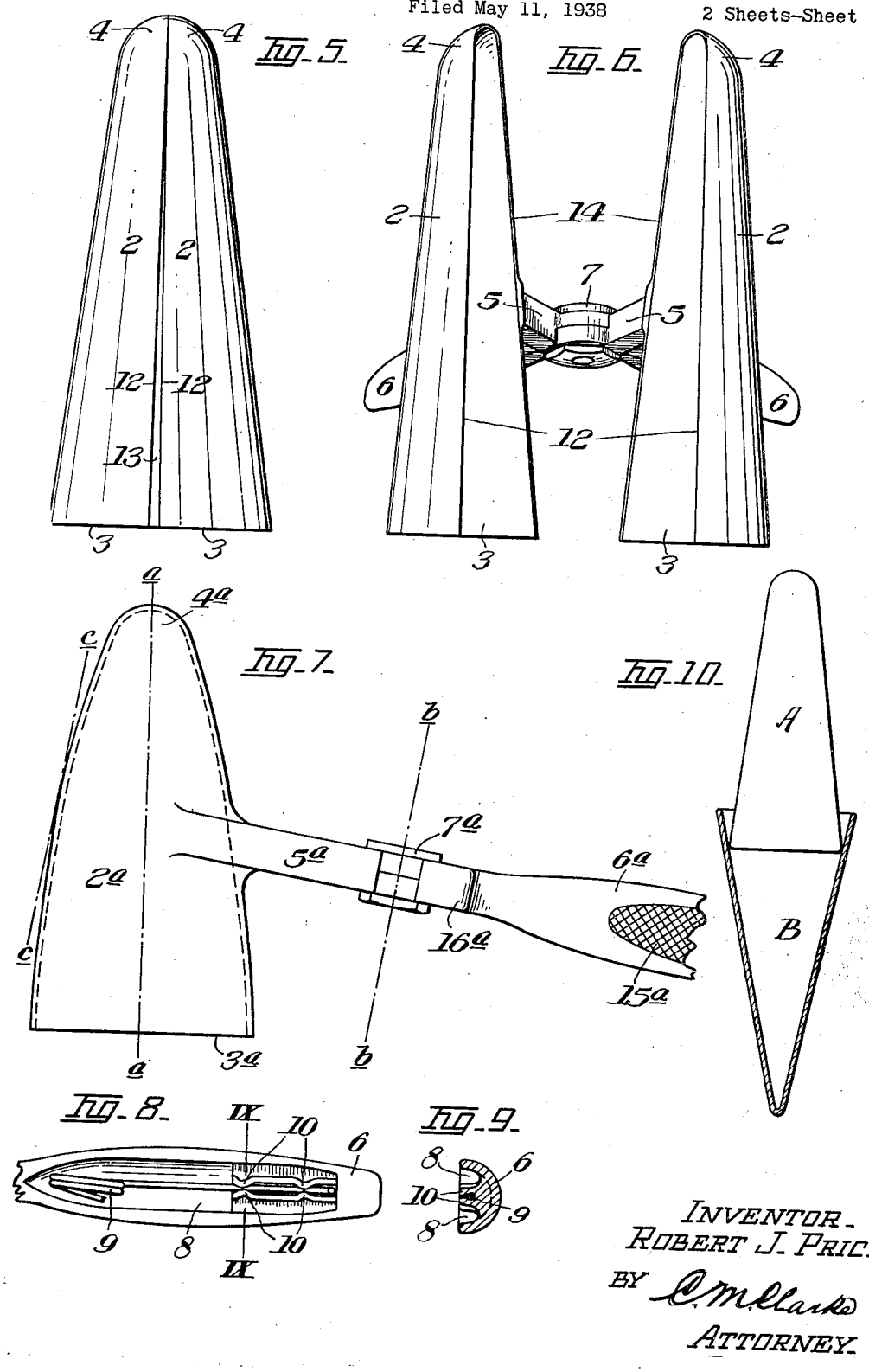
INVENTOR.
ROBERT J. PRICE
BY C. M. Clarke
ATTORNEY.

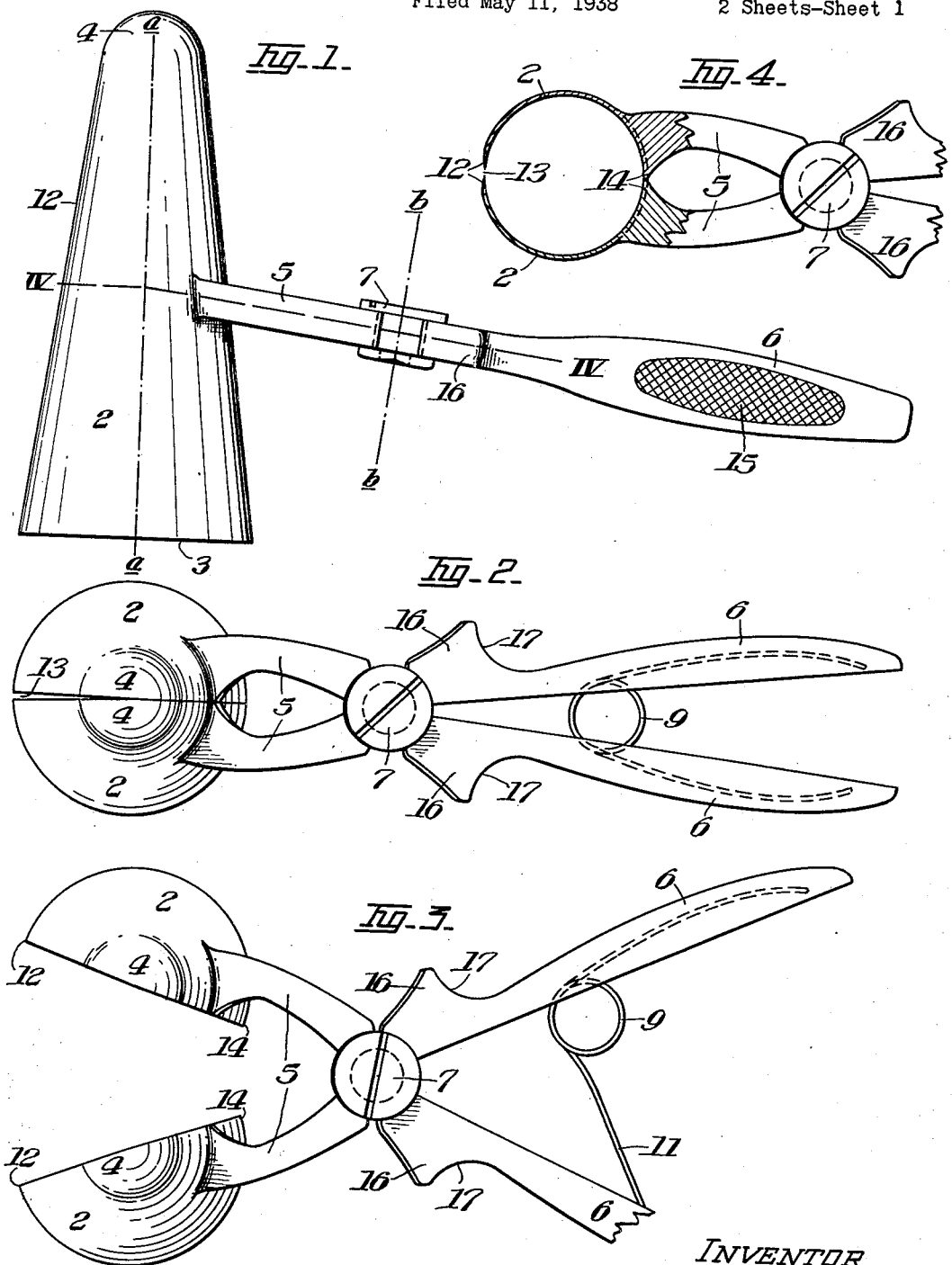

Patented July 11, 1939

2,165,941

UNITED STATES PATENT OFFICE 2,165,941

ICE CREAM DIPPER

Robert J. Price, Uniontown, Pa.

Application May 11, 1938, Serial No. 207,250

7 Claims. (Cl. 107—48)

My invention consists of an improvement in ice cream dippers and formers, particularly adapted to the operation of removing and forming a cone shaped unit for placement in a supporting pastry cone for consumption. It has in view to provide a device of such character consisting of a pair of rounded top open bottom half-cones operatively connected by a pair of pivotally connected spring retracted handles, adapted to be used in the manner hereinafter described.

The invention is generally similar in construction and operation to that shown in my prior Patent No. 2,063,754, but has certain features of improvement, developed by experience in commercial use, which are of material advantage and benefit, both to the user and customer, as hereinafter described.

Preferred forms of the invention are illustrated in the accompanying drawings, in which:

Fig. 1 is a view in side elevation of the dipper in closed position;

Fig. 2 is a plan view of Fig. 1;

Fig. 3 is a similar plan view showing the device in open position;

Fig. 4 is a generally horizontal sectional view on the line IV—IV of Fig. 1;

Fig. 5 is a front view in elevation showing the relation of the semicone halves in closed position;

Fig. 6 is a similar view showing the semicone halves in opened position;

Fig. 7 is a view like Fig. 1 showing a modified construction;

Fig. 8 is an inner face view of one of the grasping or operating handles or arms illustrating the connection of the opening spring;

Fig. 9 is a cross section on the line IX—IX of Fig. 8;

Fig. 10 is a sectional view of a conventional pastry cone with the formed unit placed therein.

In the prevailing practice of vending ice cream in such pastry cones, they are filled or partly filled by scooping an indeterminate quantity of ice cream from a can or the like, and placing it in the cone, with more or less pressure and condensation, but with no certainty that the customer is receiving a full measure.

Another method in common use is to fill the upper portion only of the cone by use of a spoon or scoop and to form a pile above the top of the cone of indeterminate dimensions.

With either of such operations even approximate fair measurement is extremely doubtful, and undesirable condensation of the cream results.

Also, when the cream is inserted in the cone, filling or approximately filling it, and with spoon or scoop pressure, it becomes necessary to bite through the supporting cone clear to the bottom, with accompanying waste, dripping and smearing, especially when the cream softens from the temperature of the hand. This feature is especially objectionable during consumption of ice cream in cones by children.

In my invention I provide against all of these objections by the formation of a substantially exact measured quantity of cream, of uniform initial texture throughout. Also, by such formation, due to the construction of my improved dipper, a fully formed cone of normal initial consistency is formed, and inserted base down into the top of the pastry cone, and projects thereabove in easily available full measure and attractive form.

The objects in view in the present invention are to provide an improved handle construction affording greater ease and certainty of hand manipulation for either open or closed dipping; more positive and desirable relation to each other of the semicone halves; means allowing for escape of resisting air; an improved spring mounting for handle and semicone opening; and increased simplicity of construction contributing to efficiency and economy of manufacture and use.

The main forming elements of the dipper comprise two similar semicone halves 2, 2, open at their bases as at 3 and terminating in semispherical or rounded tops 4.

These halves are made of suitable metal, preferably of a more or less malleable or ductile alloy, adapted to be manufactured by die casting operation, and capable of maintaining a high polish contributing to appearance and sanitary use.

The semicones 2 are integrally connected with the inner portions 5 of a pair of operating handles or arms 6, 6, which are pivotally connected by bolt 7 and have outer grasping handles, preferably hollowed for clearance as at 8. One of the handles has a looped separating spring 9 secured to it by pinching or swaging together around one of the wire terminals the comparatively thin lip portions 10. Due to the ductility of the metal these may be readily separated for release of the spring for removal or replacement at any time, if required. The free terminal 11 of the spring bears against the other arm for normal separation of both arms and the semicones 2, as in Fig. 3.

The outer terminal edges 12 of each semicone are tapered to an approximate tapered knife edge for side dipping, and when closed are spaced apart by a gradually widening or uniform front clearance opening 13 extending for the entire length of the dipper, as in Fig. 5. The opposite or rear edges 14, on the contrary, preferably of full thickness, are designed to make movement limiting abutting contact, as in Fig. 4.

It will be observed that the pair of handles are slopingly disposed downwardly with respect to the central axis $a$, $a$, of the semicones, as in Fig. 1, and that the pivoting axis $b$, $b$, is in substantial parallelism with the outer edges 12.

Such relative arrangement provides not only the best and most effective endwise scooping action with the device in closed position, but also for side scooping when open. With either operation closing of the semicones effects abutting contact of rear edges 14, thus limiting complete closing of the front edges 12, thereby maintaining the space 13 throughout their length.

Of course the rear edges 14 may be in continuous closed contact, or only at intervals as by spaced abutting portions equally capable of effecting incomplete closing of the front edges 12. The clearance opening 13 may be slightly tapering as shown or of continuous uniform width, merely by terminating the edges 12 properly with relation to the final movement-limiting closing of rear edges 14.

The particular advantage of such space is that at all lengthwise portions of the molding cavity, I provide for free circulation of air, avoiding any air compression resistance to free entrance of ice cream, and ensuring complete and uniform filling and formation of each unit, at all times.

As shown in Fig. 6, because of the pivoting relation to the edges 12, the front side scooping edges are maintained in substantial parallelism when fully open for either right or left hand side scooping, thus providing for uniform filling and final closing without undue compression, when the device is properly used.

Such filling, after scraping off any surplus from the open end, also will be uniform in content from one end to the other, when the front edges of the sides 2 are then brought almost together, as in Fig. 5. By such construction and operation the unit of ice cream is severed from the mass and formed into the final cone for delivery without any condensation, and of continuously uniform amount and finished shape.

Thereupon such formed unit A may be discharged, base down, into the extreme upper portion of the conventional pastry cone B, as in Fig. 10. As thus deposited the effect is not only pleasing, finished and attractive, but convincing as to its full measure integrity and value, with the additional feature of easy and satisfactory consumption. Practically the entire cream unit may be eaten without encroachment on any portion of the pastry cone, except perhaps the extreme top, and without liability to abnormal softening or dripping. This is because of its remoteness from temperature heating from the hand of the user.

The main advantage however is in a resulting cream unit of perfect uniform shape and size, and of normal consistency without compression and condensation.

The gripping handle 6 are especially designed for firm grasping by the operator, outwardly bowed with checkered rough convex faces 15, and having abutment extensions or shoulders 16 provided with concaved bearing faces 17 for finger and thumb bracing.

These features are of especial advantage in side dipping and in closing the sides together, assisting the manipulation with avoidance of delay.

Fig. 7 illustrates a modification in the form or shape of the semicones 2a which, instead of having straight tapering sides, are bowed outwardly as to their main walls and both front and rear meeting edges, for formation of an oval shaped unit.

Otherwise the construction and operation is the same as above described, the several parts being similarly identified with the exponent $a$.

It will be noted also that the same relation of the pivoting axis $b$, $b$, to the axial line $a$, $a$, is maintained, and that axis $b$, $b$, is in substantial parallelism with a line $c$, $c$, tangential to the middle bowed front edge portions of the oval shape semicone.

Such modified form of the opening and closing molding members effects the formation of a tapering curving or partly oval shaped unit, having an equal content full body attractive appearance and customer appeal.

The construction, operation and advantages of my improved form of ice cream dipper will be understood and appreciated by all those accustomed to use such devices for shaping and measuring plastic units.

It provides a highly efficient means for rapid, convenient and accurate measurement and perfect formation of consistently similar portions, as removed from the mass contained in an ice cream receptacle. Depending on the hardness or softness of the mass, the proper portion is easily and quickly removed, either by side dipping when open or by endwise filling when closed.

It avoids both underfilling and overfilling or condensation, and entirely prevents objectionable air pockets tending to limit a full charge, by the air vent provided.

Due to the one piece or integral construction of each semicone with its pivoting handle the construction is very strong and reliable, of but few parts and of long time serviceability and efficiency, and is easily kept clean and of polished attractive appearance.

I claim:

1. An ice cream dipper composed of a pair of open bottom semicones having rounded closing tops, the rear edge portions of which are in lengthwise contact when closed to limit complete closing of the opposite edges, said opposite edges being so disposed as to make closing contact at the top and provide an opening towards the bottom for air venting in filling, and handles therefor pivoted to each other and provided with an opening spring.

2. An ice cream dipper composed of a pair of open bottom semicones having rounded closing tops, the rear edge portions of which are in lengthwise contact when closed to limit complete closing of the opposite edges, and integral pivotally connected handles therefor disposed toward the semicone bottoms and provided with an opening spring and finger and thumb bracing abutments.

3. An ice cream dipper composed of a pair of open bottom semicones having rounded closing tops, the rear edge portions of which are in lengthwise contact when closed to limit complete closing of the opposite edges, said opposite edges being so disposed as to make closing contact at the top and provide an opening towards the bottom for air venting in filling, and handles therefor pivoted to each other on a hinge line approximately parallel with said opposite edges.

4. An ice cream dipper composed of a pair of open bottom semicones having rounded closing tops, each of said semicones having a rear abutting edge and a front scooping edge, and pivotally connected handles therefor inclined from the middle portion of the semicones at substantially right angles to said front scooping edges to effect opening and closing of the front edges in substantial parallelism.

5. An ice cream dipper composed of a pair of open bottom semicones having rounded closing tops, each of said semicones having a rear abutting edge and a front scooping edge, and pivotally connected handles therefor inclined from the middle portion of the semicones at substantially right angles to said front scooping edges to effect opening and closing of the front edges in substantial parallelism and with variable non-parallel opening and closing of the rear edges.

6. An ice cream dipper composed of a pair of open bottom semicones having rounded closing tops, and pivotally connected integral handles therefor inclined toward the open bottoms thereof and angularly disposed with respect to the axial center of the semicones for full substantially parallel front separation and partial non-parallel rear separation thereof.

7. In an ice cream dipper as disclosed, a semicone having an integral pivoting handle of malleable metal and an extended gripping arm having an interior clearance cavity and a pair of closely adjacent closing swaging lips, and a separating spring having a fixed terminal held between said lips and a free opening terminal engageable with the opposite inner portion of a cooperating similar handle pivoted to said handle.

ROBERT J. PRICE.